United States Patent
Liu et al.

(10) Patent No.: US 9,372,738 B2
(45) Date of Patent: Jun. 21, 2016

(54) DATA PROCESSING METHOD AND SYSTEM FOR ACQUIRING DRAWING DATA

(71) Applicant: SHENZHEN AUDAQUE DATA TECHNOLOGY LTD, Middle Nanshan District Shenzhen (CN)

(72) Inventors: Hang Liu, Shenzhen (CN); Xibei Jia, Shenzhen (CN)

(73) Assignee: Shenzhen Audaque Data Technology, Shenzhen (CN)

( * ) Notice: Subject to any disclaimer, the term of this patent is extended or adjusted under 35 U.S.C. 154(b) by 0 days.

(21) Appl. No.: 14/655,260

(22) PCT Filed: Jun. 4, 2014

(86) PCT No.: PCT/CN2014/079147
§ 371 (c)(1),
(2) Date: Jun. 24, 2015

(87) PCT Pub. No.: WO2015/010504
PCT Pub. Date: Jan. 29, 2015

(65) Prior Publication Data
US 2016/0085598 A1    Mar. 24, 2016

(30) Foreign Application Priority Data
Jun. 8, 2013  (CN) .......................... 2013 1 0231417

(51) Int. Cl.
*G06F 13/00*    (2006.01)
*G06F 9/54*    (2006.01)
(Continued)

(52) U.S. Cl.
CPC . *G06F 9/541* (2013.01); *G06T 1/00* (2013.01); *G06T 11/206* (2013.01)

(58) Field of Classification Search
CPC ........................ G06F 9/45512; G06T 15/005
USPC ........................................ 345/522; 719/320
See application file for complete search history.

(56) References Cited

U.S. PATENT DOCUMENTS 9,176,700 B2 * 11/2015 Scheidhauer ............. G06F 3/14

FOREIGN PATENT DOCUMENTS

CN    1610400    4/2005
CN    102883187    1/2013
(Continued)

OTHER PUBLICATIONS

International Search Report for PCT/CN2014/079147 dated Sep. 4, 2014.
(Continued)

*Primary Examiner* — Andy Ho
(74) *Attorney, Agent, or Firm* — Dicke, Billig & Czaja PLLC

(57) ABSTRACT

A data processing method comprises: an Adobe Flex acquiring a user drawing command, the drawing command comprising an initial end serial number and a termination end serial number; the Adobe Flex searching for drawing data in a buffer according to the initial end serial number and the termination end serial number; when some drawing data corresponding to the initial end serial number and the termination end serial number is only found, the Adobe Flex sending a data acquisition request to java swing by using javascript, the data acquisition request comprising an initial end serial number and a termination end serial number corresponding to drawing data that are not found; and the java swing returning the corresponding drawing data to the Adobe Flex according to the initial end serial number and the termination end serial number corresponding to the drawing data that are not found. Also provided is a corresponding data processing system. In the embodiments, data required by a graph is acquired by an interval, and data to be acquired by javascript is reduced, thereby effectively solving the problem that the drawing speed under a large data amount is slow due to slow javascript data processing speed.

8 Claims, 3 Drawing Sheets

(51) Int. Cl.
*G06T 1/00* (2006.01)
*G06T 11/20* (2006.01)

(56) References Cited

FOREIGN PATENT DOCUMENTS

| CN | 102930592 | 2/2013 |
| CN | 103049883 | 4/2013 |
| JP | H05204356 | 8/1993 |

OTHER PUBLICATIONS

Written Opinion of the International Searching Authority for PCT/CN2014/079147 dated Sep. 1, 2014.

* cited by examiner

DATA PROCESSING METHOD AND SYSTEM FOR ACQUIRING DRAWING DATA

TECHNICAL FIELD

The present disclosure relates to data processing field, and particularly to a data processing method and system.

BACKGROUND OF THE DISCLOSURE

In a java swing program embedded in an application of Adobe Flex, the communication between the client Adobe Flex and the java swing is generally carried out by using javascript. In existing applications, since the communication between the Adobe Flex and the java swing basically involves small data, the data processing capability of javascript can guarantee a normal communication between the Adobe Flex and the java swing.

In a prior art, the Adobe Flex is used to draw graphs to interact with a user, while the java swing is used to extract data from a database. After the Adobe Flex acquires a drawing command, according to the drawing command, the data of all intervals corresponding to the drawing command would be acquired from the java swing, and then the Adobe Flex will, according to the data, draws the graph of an interval selected by a user. Thus, the Adobe Flex acquires all data through one communication, which has advantages of fewer interaction with the java swing and timely graphics rendering.

In the prior art, with the increase of the data required in displaying a graph, due to the limitation of the data processing capability of javascript, the Adobe Flex has to spend more time on acquiring the drawing data, which leads to an obviously slow speed of drawing a graph; therefore, in the case of increased drawing data, the data processing capability of javascript can easily become the bottleneck of the overall communication.

SUMMARY

The technical problem to be solved in the present disclosure is to provide a data processing method.

Accordingly, the present disclosure also provides a system for the data processing method.

To solve the above problem, the present disclosure discloses a data processing method, comprising:

an Adobe Flex acquiring a user drawing command, the drawing command at least comprising an initial end serial number and a termination end serial number;

the Adobe Flex searching for drawing data in a buffer according to the initial end serial number and the termination end serial number;

when some drawing data corresponding to the initial end serial number and the termination end serial number is only found, the Adobe Flex sending a data acquisition request to java swing by using javascript, the data acquisition request comprising an initial end serial number and a termination end serial number corresponding to drawing data that are not found;

the java swing returning the corresponding drawing data to the Adobe Flex according to the initial end serial number and the termination end serial number corresponding to the drawing data that are not found.

Further, after the Adobe Flex acquiring a user drawing command, further comprising:

the Adobe Flex searching for drawing data in a buffer according to the initial end serial number and the termination end serial number;

when drawing data corresponding to the initial end serial number and the termination end serial number is found, the Adobe Flex drawing a graph according to the drawing data; or, when drawing data corresponding to the initial end serial number and the termination end serial number is not found, the Adobe Flex sending a data acquisition request to java swing by using javascript.

Further, the method further comprising: the Adobe Flex receiving the drawing data which is returned by the java swing and corresponded to the initial end serial number and termination end serial number corresponding to the drawing data that are not found, and the Adobe Flex performing a fusion on the drawing data and the drawing data found in the buffer.

Further, after the Adobe Flex performing a fusion on the decoded and decompressed drawing data and the drawing data found in the buffer, further comprising:

the Adobe Flex performing drawing according to the fused drawing data, and storing the fused drawing data in the buffer.

The present disclosure also provides a data processing system, comprising an Adobe Flex module and a java swing module;

the Adobe Flex module configured for acquiring a user drawing command, the drawing command at least comprising an initial end serial number and a termination end serial number; searching for drawing data in a buffer according to the initial end serial number and the termination end serial number; when some drawing data corresponding to the initial end serial number and the termination end serial number is only found, sending a data acquisition request to java swing by using javascript, the data acquisition request comprising an initial end serial number and a termination end serial number corresponding to drawing data that are not found;

the java swing module configured for returning the corresponding drawing data to the Adobe Flex module according to the initial end serial number and the termination end serial number corresponding to the drawing data that are not found.

Further, the Adobe Flex module is further configured for after acquiring the user drawing demand, searching for drawing data in a buffer according to the initial end serial number and the termination end serial number;

when drawing data corresponding to the initial end serial number and the termination end serial number is found, drawing a graph according to the drawing data; or, when drawing data corresponding to the initial end serial number and the termination end serial number is not found, sending a data acquisition request to java swing by using javascript.

Further, the Adobe Flex module is further configured for performing a fusion on the drawing data and the drawing data found in the buffer.

Further, the Adobe Flex module is further configured for performing drawing according to the fused drawing data, and storing the fused drawing data in the buffer.

Compared with the prior art, the present disclosure has the following advantages: data required by a graph is acquired by an interval, and data to be acquired by using javascript is reduced, thereby effectively solving the problem that the drawing speed under a large data amount is slow due to slow javascript data processing speed.

DETAILED DESCRIPTION

The present disclosure will be described in detail by reference to the accompanying drawings and embodiments for more clearly understanding of the objects, technical features and advantages of the present disclosure.

Figure 1:
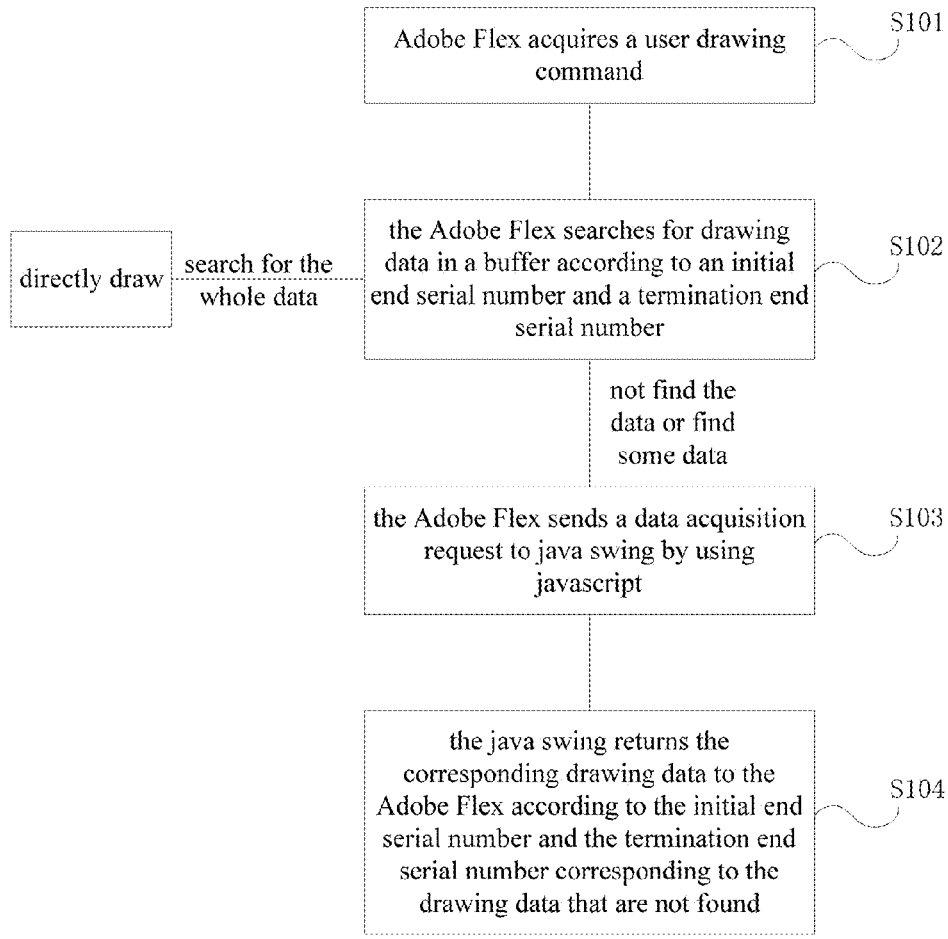
FIG. 1 is a flowchart schematically illustrating the data processing method of one embodiment of the present disclosure.

Referring to FIG. 1, a flowchart of the data processing method of one embodiment of the present disclosure is shown.

The embodiment of the present disclosure provides a data processing data, comprising:

Step S101: an Adobe Flex acquiring a user drawing command, a selection drawing command comprising an initial end serial number and a termination end serial number;

When a user needs to draw a graph within a region, the corresponding interval can be selected. After receiving a drawing command formed by the interval selected by the user, the Adobe Flex acquires an initial end serial number and a terminal end serial number contained from the drawing command.

Figure 2:
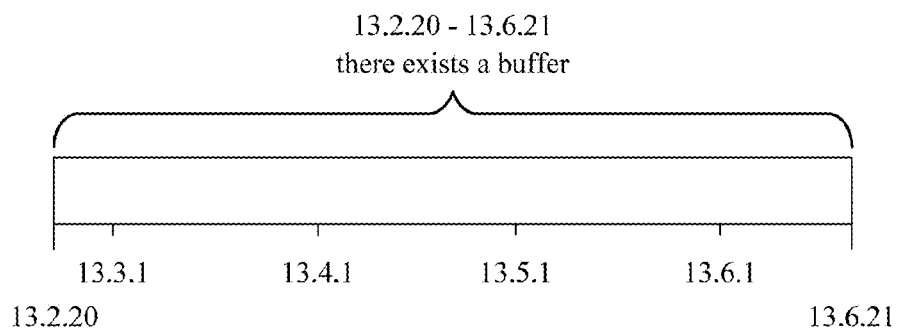
FIG. 2 is a diagram schematically illustrating querying data in a buffer according to the data processing method of one embodiment of the present disclosure.

Step S102: the Adobe Flex searching for drawing data in a buffer according to the initial end serial number and the termination end serial number;

Further, after the Adobe Flex acquiring a user drawing command, further comprising:

the Adobe Flex searching for drawing data in a buffer according to the initial end serial number and the termination end serial number;

when drawing data corresponding to the initial end serial number and the termination end serial number is found, the Adobe Flex drawing a graph according to the drawing data; or, when drawing data corresponding to the initial end serial number and the termination end serial number is not found, the Adobe Flex sending a data acquisition request to java swing by using javascript. For example, three cases may be turned up when the Adobe Flex finds the drawing data in the buffer according to the initial end serial number and the termination end serial number, which are illustrated as follows:

As shown in FIG. 2, provided that the graph a user would like to display needs a drawing data between an initial end serial number 20130220 and a termination end serial number 20130621, if, according to the initial end serial number 20130220 and the termination end serial number 20130621 of the user's drawing command, there exists a corresponding data within the buffer of Adobe Flex, then the Adobe Flex can directly find the corresponding drawing data in the buffer according to the initial end serial number and the termination end serial number, and the Adobe Flex can directly acquire the drawing data from the buffer.

Figure 3:
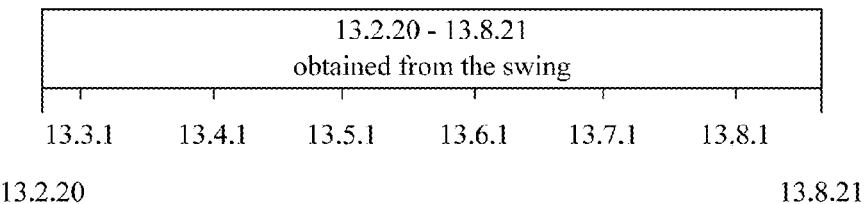
FIG. 3 is a diagram schematically illustrating querying data in a buffer according to the data processing method of one embodiment of the present disclosure.

As shown in FIG. 3, provided that the graph a user would like to display needs the drawing data between an initial end serial number 20130219 and a termination end serial number 20130820, if there does not exist a data of such interval within the buffer of the Adobe Flex, when the Adobe Flex queries for the drawing data in the buffer according to the initial end serial number and the termination end serial number, it will not find the corresponding drawing data, then the Adobe Flex can directly send a data acquisition request, the request comprising the initial end serial number 20130219 and the termination end serial number 20130820.

Figure 4:
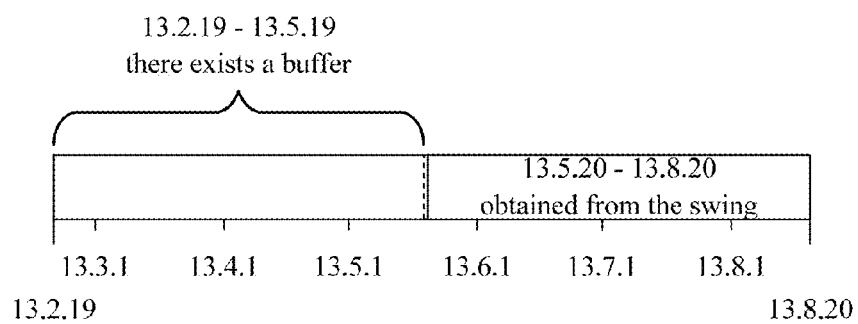
FIG. 4 is a diagram schematically illustrating querying data in a buffer according to the data processing method of one embodiment of the present disclosure.

Step S103: when some drawing data corresponding to the initial end serial number and the termination end serial number is only found, the Adobe Flex sending a data acquisition request to java swing by using javascript, the data acquisition request comprising an initial end serial number and a termination end serial number corresponding to drawing data that are not found;

As shown in FIG. 4, provided that a graph a user would like to display needs the drawing data between an initial end serial number 20130219 and a termination end serial number 20130820, if the Adobe Flex only find the data between the initial end serial number 20130219 and the termination end serial number 20130519 in the buffer, the Adobe Flex needs to ask the java swing for the data between the initial end serial number 20130520 and the termination end serial number 20130820, and the data acquisition request the Adobe Flex sent to the java swing comprises the initial end serial number 20130520 and the termination end serial number 20130820.

Step S104: the java swing returning the corresponding drawing data to the Adobe Flex according to the initial end serial number and the termination end serial number corresponding to the drawing data that are not found.

Further, after the java swing returning corresponding drawing data to the Adobe Flex according to the received initial end serial number and termination end serial number corresponding to the drawing data that are not found, further comprising:

the Adobe Flex performing a fusion on the drawing data and the drawing data found in the buffer.

Figure 5:
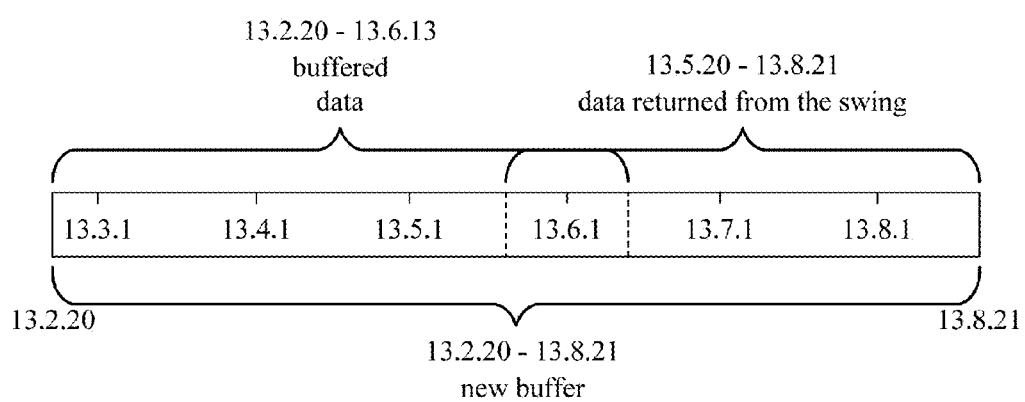
FIG. 5 is a diagram schematically illustrating caching data according to the data processing method of one embodiment of the present disclosure.
Figure 6:
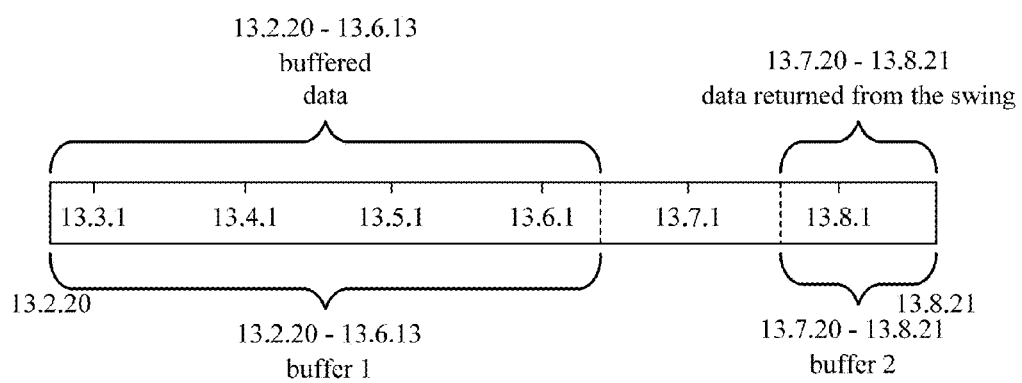
FIG. 6 is a diagram schematically illustrating caching data according to the data processing method of one embodiment of the present disclosure.

Further, after the Adobe Flex performing a fusion on the decoded and decompressed drawing data and the drawing data found in the buffer, further comprising:

the Adobe Flex performing drawing according to the fused drawing data, and storing the fused drawing data in the buffer. If the buffered data is empty, the drawing data returned from the java swing is set to be the buffered data. If there is an intersection between the buffered data and the drawing data returned from the java swing, the intersection is saved, as shown in FIG. 5. If there is no intersection between the buffered data and the drawing data returned from the java swing, both are set to the buffer respectively, as shown in FIG. 6.

By means of buffering data in the Adobe Flex, when the drawing data needed by a graph drawn by a user is buffered in the Adobe Flex, there is no need to ask the java swing for the data; when the Adobe Flex buffers some required drawing data, the Adobe Flex only asks the java swing for other required data, which reduces the data transferred by javascript, hence when needed to a large amount of drawing data, if there are some data in the buffer, the data processing capability of javascript will not be restricted to slow the speed of drawing, and the speed of responding to draw is improved.

For the embodiment of the system, since it is substantially similar to the embodiment of the method, the description thereof is relatively simple, and the involved part thereof can see the corresponding part of the embodiment of the method.

Figure 7:
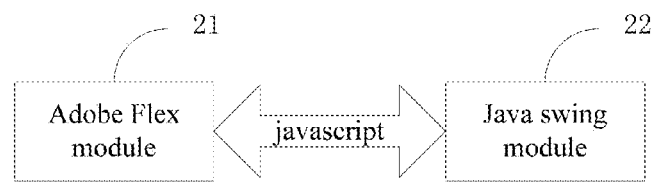
FIG. 7 is a structural diagram schematically illustrating the data processing system of one embodiment of the present disclosure.

As shown in FIG. 7, it is a structural diagram of the data processing system of one embodiment of the present disclosure.

The data processing system provided in the embodiment of the present disclosure comprises:

comprises an Adobe Flex module 21 and a java swing module 22;

the Adobe Flex module 21 configured for acquiring a user drawing command, the drawing command at least comprising an initial end serial number and a termination end serial number; searching for drawing data in a buffer according to the initial end serial number and the termination end serial number; when some drawing data corresponding to the initial end serial number and the termination end serial number is only found, sending a data acquisition request to java swing by using javascript, the data acquisition request comprising an initial end serial number and a termination end serial number corresponding to drawing data that are not found;

the java swing module 22 configured for returning the corresponding drawing data to the Adobe Flex module 21 according to the initial end serial number and the termination end serial number corresponding to the drawing data that are not found.

Further, the Adobe Flex module 21 is also configured for after acquiring the user drawing demand, searching for drawing data in a buffer according to the initial end serial number and the termination end serial number;

when drawing data corresponding to the initial end serial number and the termination end serial number is found, drawing a graph according to the drawing data; or, when drawing data corresponding to the initial end serial number and the termination end serial number is not found, sending a data acquisition request to java swing by using javascript.

Further, the Adobe Flex module 21 is also configured for performing a fusion on the drawing data and the drawing data found in the buffer.

Further, the Adobe Flex module 21 is also configured for performing drawing according to the fused drawing data, and storing the fused drawing data in the buffer.

Each embodiment of the present disclosure is described recursively and mainly explains the difference from other embodiments, and the same or similar part of each embodiment can be referred to each other.

The data processing method and system provided in the present disclosure are described above in details. The principles and embodiments of the present disclosure are described by means of specific embodiments, and the description of the above embodiments is only used to help in understanding the method and the idea of the present disclosure; simultaneously, for those of ordinary skill in the art, under the concept of the present disclosure, there could be some changes in detailed embodiments and applications. In conclusion, the contents of the specification should not be interpreted as limiting the present disclosure.

The invention claimed is:

1. A data processing method, comprising:
   an Adobe Flex acquiring a user drawing command, the drawing command at least comprising an initial end serial number and a termination end serial number;
   the Adobe Flex searching for drawing data in a buffer according to the initial end serial number and the termination end serial number;
   when some drawing data corresponding to the initial end serial number and the termination end serial number is only found, the Adobe Flex sending a data acquisition request to java swing by using javascript, the data acquisition request comprising an initial end serial number and a termination end serial number corresponding to drawing data that are not found; and
   the java swing returning the corresponding drawing data to the Adobe Flex according to the initial end serial number and the termination end serial number corresponding to the drawing data that are not found.

2. The method according to claim 1, wherein after the Adobe Flex acquiring a user drawing command, further comprising:
   when drawing data corresponding to the initial end serial number and the termination end serial number is found, the Adobe Flex drawing a graph according to the drawing data; or, when drawing data corresponding to the initial end serial number and the termination end serial number is not found, the Adobe Flex sending a data acquisition request to java swing by using javascript.

3. The method according to claim 2, further comprising: the Adobe Flex receiving the drawing data which is returned by the java swing and corresponded to the initial end serial number and termination end serial number corresponding to the drawing data that are not found, and
   the Adobe Flex performing a fusion on the drawing data and the drawing data found in the buffer.

4. The method according to claim 3, wherein after the Adobe Flex performing a fusion on decoded and decompressed drawing data and the drawing data found in the buffer, further comprising:
   the Adobe Flex performing drawing according to the fused drawing data, and storing the fused drawing data in the buffer.

5. A data processing system, comprising an Adobe Flex module and a java swing module;
   the Adobe Flex module, via a processor, configured for acquiring a user drawing command, the drawing command at least comprising an initial end serial number and a termination end serial number; searching for drawing data in a buffer according to the initial end serial number and the termination end serial number; when some drawing data corresponding to the initial end serial number and the termination end serial number is only found, sending a data acquisition request to java swing by using javascript, the data acquisition request comprising an initial end serial number and a termination end serial number corresponding to drawing data that are not found;
   the java swing module, via the processor, configured for returning the corresponding drawing data to the Adobe Flex module according to the initial end serial number and the termination end serial number corresponding to the drawing data that are not found.

6. The system according to claim 5, wherein the Adobe Flex module is further configured to
   when drawing data corresponding to the initial end serial number and the termination end serial number is found, drawing a graph according to the drawing data; or, when drawing data corresponding to the initial end serial number and the termination end serial number is not found, sending a data acquisition request to java swing by using javascript.

7. The system according to claim 6, the Adobe Flex module is further configured for performing a fusion on the drawing data and the drawing data found in the buffer.

8. The system according to claim 7, the Adobe Flex module is further configured for performing drawing according to the fused drawing data, and storing the fused drawing data in the buffer.

* * * * *